(12) United States Patent
Schuhmacher et al.

(10) Patent No.: US 8,851,572 B2
(45) Date of Patent: Oct. 7, 2014

(54) VEHICLE SEAT, IN PARTICULAR MOTOR VEHICLE SEAT

(75) Inventors: Gerd Schuhmacher, Wuppertal (DE); Dieter Henkel, Remscheid (DE); Volker Scharwächter, Remscheid (DE); Heinz Voss, Leverkusen (DE); Uwe Assmann, Remscheid (DE); Georg Fischer, Winnweiler (DE); Volker Schäfer, Otterbach (DE); Günter Franzmann, Rockenhausen (DE); Werner Liborius, Nieder-mohr (DE); Lars Kramm, Trippstadt (DE); Harald Wolsiefer, Krickenbach (DE)

(73) Assignee: Johnson Controls Components GmbH & Co. KG., Kaiserslautern (DE)

( * ) Notice: Subject to any disclaimer, the term of this patent is extended or adjusted under 35 U.S.C. 154(b) by 579 days.

(21) Appl. No.: 13/140,688

(22) PCT Filed: Dec. 9, 2009

(86) PCT No.: PCT/EP2009/008797
§ 371 (c)(1),
(2), (4) Date: Jun. 17, 2011

(87) PCT Pub. No.: WO2010/081508
PCT Pub. Date: Jul. 22, 2010

(65) Prior Publication Data
US 2011/0260520 A1    Oct. 27, 2011

(30) Foreign Application Priority Data

Jan. 13, 2009  (DE) .......................... 10 2009 005 130
Jun. 30, 2009  (DE) .......................... 10 2009 031 581

(51) Int. Cl.
*B60N 2/20* (2006.01)
*B60N 2/68* (2006.01)
*B60N 2/44* (2006.01)

(52) U.S. Cl.
CPC .............. *B60N 2/682* (2013.01); *B60N 2/4435* (2013.01)
USPC ........................................................ 297/362

(58) Field of Classification Search
USPC ............................................. 297/361.1–376
See application file for complete search history.

(56) References Cited

U.S. PATENT DOCUMENTS 3,823,440 A * 7/1974 Klingelhofer ............. 297/373 X
4,290,647 A   9/1981 Hensel et al.
(Continued)

FOREIGN PATENT DOCUMENTS

CN  200945830 Y  9/2007
CN  201026822 Y  2/2008
(Continued)

*Primary Examiner* — Rodney B White
(74) *Attorney, Agent, or Firm* — McGlew and Tuttle, P.C.

(57) ABSTRACT

A vehicle seat (1), in particular a motor vehicle seat, has at least one fitting (10) including two fitting components (11, 12) that can rotate relative to each other. At least one structural component (15) has at least one opening (16) for partially receiving the fitting (11, 12) and at least one mounting area (18) enclosing the opening (16) for mounting the fitting (10), by at least one weld seam (19) between the mounting area (18) and one of the two fitting components (11, 12). The mounting area (18) is reinforced by additional material relative to the other areas of the structural component (15).

18 Claims, 12 Drawing Sheets

(56) References Cited

U.S. PATENT DOCUMENTS

| | | | |
|---|---|---|---|
| 4,893,976 A | 1/1990 | Milliser et al. | |
| 5,573,345 A * | 11/1996 | Voss et al. | 297/362 X |
| 6,378,350 B1 | 4/2002 | Ito | |
| 6,572,196 B1 * | 6/2003 | Thieme et al. | 297/362 X |
| 6,805,650 B2 * | 10/2004 | Branov et al. | 297/362 X |
| 7,264,566 B2 * | 9/2007 | Dill et al. | 297/362 X |
| 7,278,689 B2 * | 10/2007 | Guillouet | 297/362 |
| 7,425,038 B2 * | 9/2008 | Deptolla | 297/362.11 |
| 7,497,520 B2 * | 3/2009 | Assmann | 297/367 R |
| 7,950,741 B2 * | 5/2011 | Mitsuhashi | 297/362 |
| 7,967,384 B2 * | 6/2011 | Hille et al. | 297/361.1 |
| 8,282,168 B2 * | 10/2012 | Kienke et al. | 297/367 R |
| 2006/0061181 A1 * | 3/2006 | Kraus et al. | 297/366 |
| 2006/0061197 A1 | 3/2006 | Messerschmidt et al. | |
| 2007/0035168 A1 * | 2/2007 | Assmann | 297/353 |
| 2007/0170765 A1 * | 7/2007 | Vossmann et al. | 297/367 |
| 2010/0171351 A1 * | 7/2010 | Thiel et al. | 297/367 R X |

FOREIGN PATENT DOCUMENTS

| | | |
|---|---|---|
| DE | 24 02 761 B1 | 6/1975 |
| DE | 78 30 544 U1 | 2/1979 |
| DE | 31 19 399 A1 | 12/1982 |
| DE | 31 30 315 A1 | 2/1983 |
| DE | 82 22 946 U1 | 1/1984 |
| DE | 101 05 282 B4 | 8/2002 |
| DE | 103 23 450 B3 | 1/2005 |
| DE | 202005007198 U1 | 9/2005 |
| FR | 832 697 A | 9/1938 |
| JP | 2003 146121 A | 5/2003 |

* cited by examiner

VEHICLE SEAT, IN PARTICULAR MOTOR VEHICLE SEAT

CROSS REFERENCE TO RELATED APPLICATIONS

This application is a United States National Phase application of International Application PCT/PCT/EP2009/008797 and claims the benefit of priority under 35 U.S.C. §119 of German Patent Applications DE 10 2009 005 130.9 filed Jan. 13, 2009 and DE 10 2009 031 581.0 filed Jun. 30, 2009, the entire contents of which are incorporated herein by reference.

FIELD OF THE INVENTION

The invention relates to a vehicle seat in particular motor vehicle seat, with at least one fitting which has two fitting parts which are rotatable relative to each other, and with at least one structural part which has at least one opening for partially receiving the fitting and at least one fastening region which surrounds the opening and is intended for fastening the fitting.

BACKGROUND OF THE INVENTION

DE 101 05 282 B4 discloses a vehicle seat of this type, the fittings of which, which serve as backrest adjusters, are fastened to adapters as structural parts. A further vehicle seat of this type is known from DE 20 2005 007 198 U1, the upper end of the structural part of which, the structural part serving as a backrest side strut, having a lower material thickness which increases toward the lower end.

SUMMARY OF THE INVENTION

The invention is based on the object of improving a vehicle seat of the type mentioned at the beginning. This object is achieved according to the invention by a vehicle seat with at least one fitting which has two fitting parts which are rotatable relative to each other, and with at least one structural part which has at least one opening for partially receiving the fitting and at least one fastening region which surrounds the opening and is intended for fastening the fitting, in particular by means of at least one first weld seam between the fastening region and one of the two fitting parts. The fastening region is reinforced in relation to the other regions of the structural part by further material.

The structural part to which the fitting can be fastened may be any component of the structure of the vehicle seat, for example a backrest side strut, a seat frame side part or an adapter which is designed specially for the connection of the structure to the fitting and is fastened to the structure. The fitting may be any adjuster of the vehicle seat, for example a backrest adjuster or a seat inclination adjuster, if appropriate even a seat height adjuster. However, the term "fitting" is also intended to include all other possible gearing and locking joints and other joints. With regard to the internal construction which is not of significance to the present invention, the fitting may be, for example, a geared fitting or a detent fitting. In order to rotate the two fitting parts relative to each other, the fitting is correspondingly driven or unlocked. The invention is suitable in particular whenever the external design of the fitting is a disk shape providing few fastening options. The fastening preferably takes place by means of a (first) weld seam, which is intended to be understood as meaning any geometries and types of welding, for example thin laser weld seams, thick MAG welding beads or individual resistance weld points.

Since the fastening region is reinforced in relation to the other regions of the structural part by further material, the material thickness is increased only in a small area, namely in the fastening region. The strength is increased in comparison to a substantially constant, low material thickness and, in particular, higher torques can be transmitted, while weight and costs are saved in comparison to a high material thickness which is identical throughout, while strength properties are comparable. In particular in the event of a crash, the forces which are introduced by the fitting or are to be passed on into the fitting can be better absorbed and passed on. The further material is preferably a material which drops off during the formation of the opening, i.e. the opening is not punched out to the final geometry thereof but rather to a smaller size, wherein material remains for a collar or for segments. The fastening region is then preferably formed by deforming or folding over a collar region of this type or by folding over at least one segment, in which case the folded-over region or the folded-over segment can be fixed to that region of the structural part which is not folded over, in particular by means of a second weld seam, which is in turn intended to be understood as meaning any geometries and types of weld. However, the fixing may also take place by means of an interlocking connection.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 7:
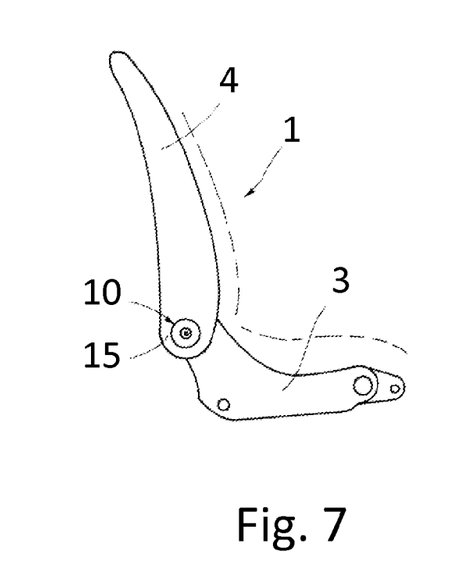
FIG. 7 is a schematic view of a vehicle seat according to the invention.
Figure 8:
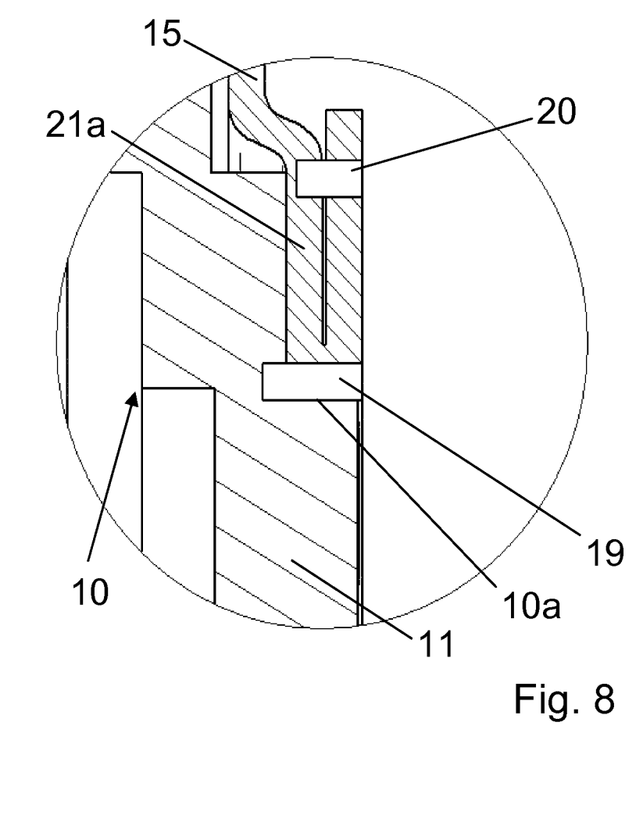
FIG. 8 is a schematic view of part of a section (detail VIII in FIG. 21) through a fitting with a structural part according to the second exemplary embodiment.
Figure 25:
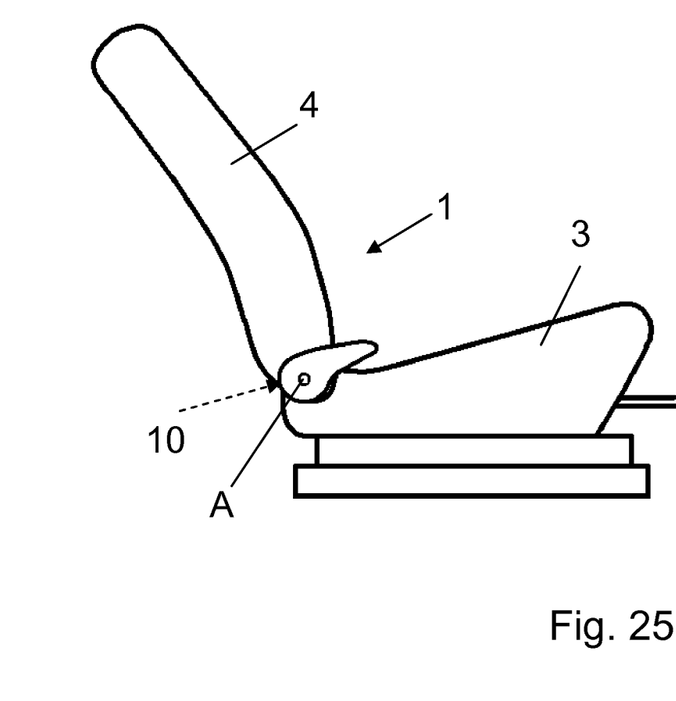
FIG. 25 is a schematic side view of a vehicle seat according to the invention.
Figure 26:
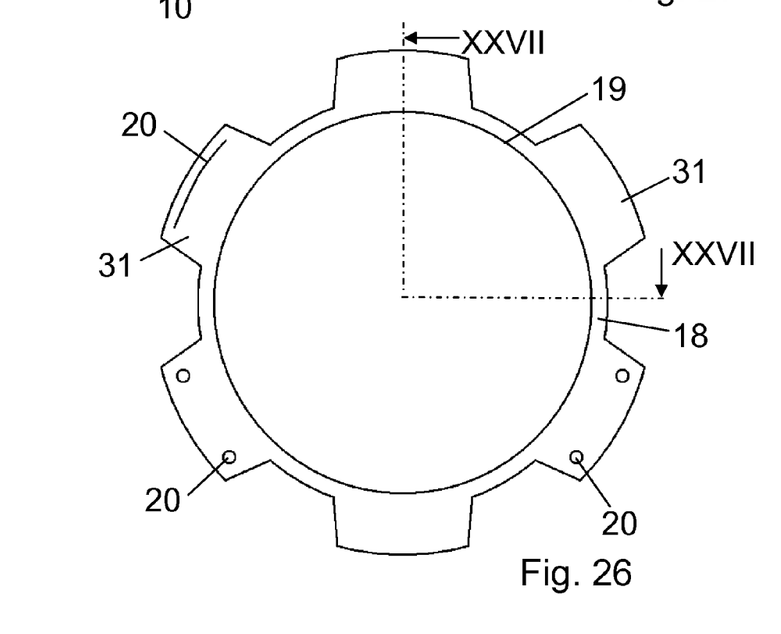
FIG. 26 is a partial view of the third exemplary embodiment without the fitting.
Figure 27:
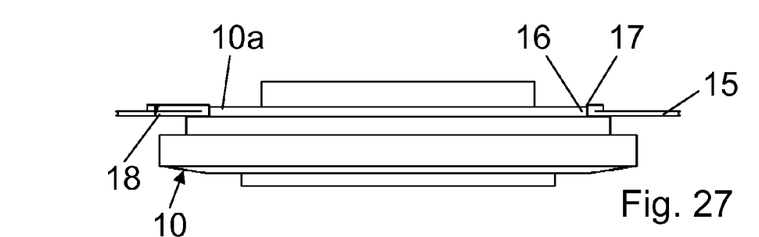
FIG. 27 is a sectional view along the line XXVII-XXVII in FIG. 26 with the fitting.

Referring to the drawings in particular, a vehicle seat 1 for a motor vehicle has a seat part 3, a backrest 4 which is attached by means of a respective fitting 10 on both sides of the vehicle seat to the seat part 3 and can be adjusted in inclination and/or freely pivoted relative thereto. In the present case, the fittings 10 are designed as detent fittings, the internal construction of which is described, for example, in WO 00/44582 A1 while said fittings, in respect of the external design thereof, have a disk shape, as described, for example, in U.S. Pat. No. 6,799,806 A. As an alternative, the fittings 10 are designed as geared fittings with an identical external design but with an internal construction as described, for example, in DE 44 36 101 A1 which discloses a self-locking eccentric epicyclic gearing. However, the internal construction of the fittings 10 may differ from said two known fittings. It is also possible to combine a single fitting 10 on one side of a vehicle seat with a joint on the other side of the vehicle seat.

The two fittings 10 are in a geared connection to each other by means of a profiled transmission rod. The transmission rod is arranged horizontally and transversely with respect to the direction of travel and is rotatable about its own axis A. A hand lever (or hand wheel) which sits in a rotationally fixed manner on the transmission rod serves for the manual actuation of the fittings 10. In the case of geared fittings, motorized actuation is also possible. The directional details below refer to the cylindrical coordinate system which is defined by the axis A.

Each fitting 10 has a first fitting part 11 which is of approximately disk-shaped design and a second fitting part 12 which is likewise of approximately disk-shaped design. In order to hold together the two fitting parts 11 and 12 axially with insertion of the components arranged between said fitting parts, a clasping ring 13 is placed from the side of the first fitting part 11 onto the second fitting part 12 and, for example, is pressed onto and/or welded to same or flanged therearound. In this case, the first fitting part 11, the second fitting part 12 and the clasping ring 13 form a disk-shaped (can-shaped) housing. The two fitting parts 11 and 12 support a driver 14 which interacts with the transmission rod, in particular is coupled thereto in a rotationally fixed manner or for carrying along therewith, and the rotation of which unlocks the fitting 10 (in the case of the latching fitting) or drives said fitting 10 (in the case of the geared fitting). The two fitting parts 11 and 12 are thus rotatable relative to each other.

Although the disk shape affords the advantage of a compact constructional form, it is precisely for this reason, namely because of the small surfaces which are available, that particular challenges arise with regard to the technology for attaching the fitting to the structures of the seat part 3 and backrest 4. For example, the attaching of the fitting 10 to a structural part 15 which is an integral subregion of the structure of the backrest 4 is described. An—at least approximately cylindrical—opening 16 is formed on the structural part 15, said opening being surrounded annularly (or in an arcuate manner) by a fastening region 18 having edges 17. The edges 17 which are arranged along two circular lines offset axially with respect to each other define the border of the opening 16. The opening 16 may also have a different geometry, for example a star shape, or a different shape with cyclic symmetry with respect to the axis A.

The structural part 15 may also be an integral subregion of the structure of the seat part 3 or a separate adapter which is connected to the structure of the backrest 4 or of the seat part 3. The use of the invention is not limited to the connection of a fitting 10 to a seat part 3 and backrest 4. On the contrary, said invention can be used in all cases of connecting fittings and components to structural components known to a person skilled in the art. For example, a fitting for a seat height adjuster can be attached in the same manner as described in DE 10 20009 008 576 A1 which is a subsequent publication.

The fitting 10 is fitted to the structural part 15 by an end side having a shoulder 10a, in the present case by that end side of the first fitting part 11 which faces away from the second fitting part 12, wherein the shoulder 10a is inserted into the opening 16 until the fitting 10 bears against the fastening region 18. The opening 16 then preferably receives the shoulder 10a in an interlocking manner. The fitting 10 fitted in this manner is connected, preferably welded, fixedly (i.e. nondetachably) to the structural part 15, for example by means of one or more first weld seams 19 which are preferably produced by laser welding. The first weld seams 19 may also be produced by different types of welding, such as MAG welding. They may be circular, circular-arc-shaped, in the form of points or of a different geometry. The opening 16 is aligned with the axis A. The annular shape (or arc shape) of the fastening region 18 defines a radial width b (for example 4 mm) which is significantly smaller than the diameter d (for example 52 mm) of the opening 16. The fastening region 18 may optionally be fixed by one or more second weld seams 20. The second weld seam 20 may optionally be of a depth such that it reaches as far as the fitting 10 and therefore, in addition to (or instead of the) first weld seam 19, fastens the fitting 10 to the structural part 15. The second weld seams 20 may likewise be circular, circular-arc-shaped, in the form of points or of a different geometry and may be produced by laser welding, MAG welding or a different welding process. Instead of or in addition to a second weld seam 20, the fastening region 18 may also be fixed by means of clinching, which can be integrated into the punching process and may optionally be supplemented later by additional second weld seams 20.

To produce an optimized connection between the structural part 15 and the first fitting part 11, further material in relation to the remaining regions of the structural part 15 is accumulated in the fastening region 18 in order to reinforce the structural part 15 in the local surroundings of the fitting 10. The additional material preferably originates from the spatial region which is now occupied by the opening 16, i.e. slopes away during the formation of the opening 16, and would normally be punched out as waste. For this purpose, starting from a metal sheet, in a preparatory step, a blank for the structural part 15 is punched out and the outer border 15a of the structural part 15 is optionally produced, for example a border which is bent over by approx. 90°—if appropriate in the same working step. At the same time or in a later step, a central region is punched out within a substantially planar, circular region which can be raised (by, for example, two material thicknesses) in the same direction as the outer border 15a.

The exemplary embodiments below differ with regard to the further machining of the structural part 15 and of the fastening region 18 produced. The method steps do not have to take place in individual manufacturing steps or molds. Depending on the mold concept, a plurality of method steps can be realized in one manufacturing step or one mold.

Figure 1:
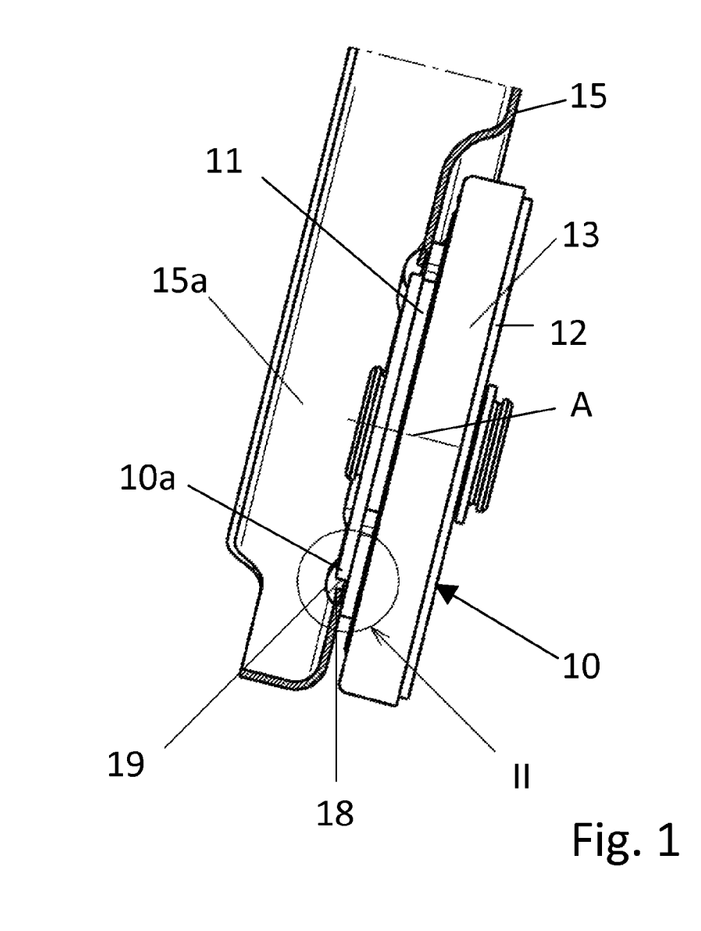
FIG. 1 is a sectional view through a part of the first exemplary embodiment along the line I-I in FIG. 5.
Figure 2:
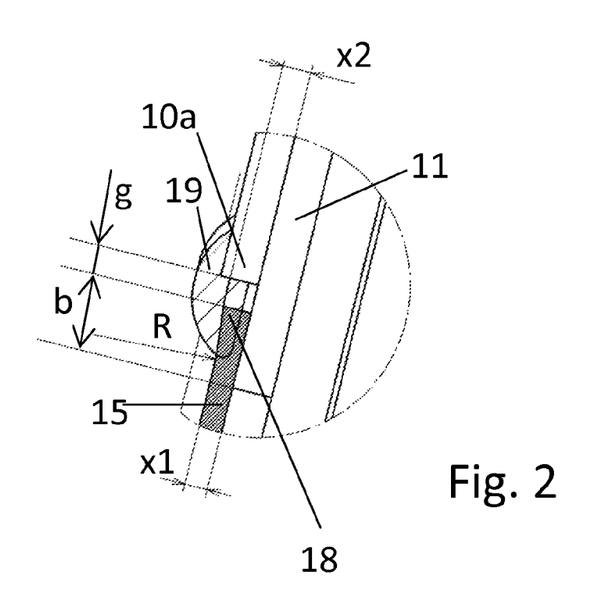
FIG. 2 is an enlargement view showing the detail II in FIG. 1.
Figure 3:
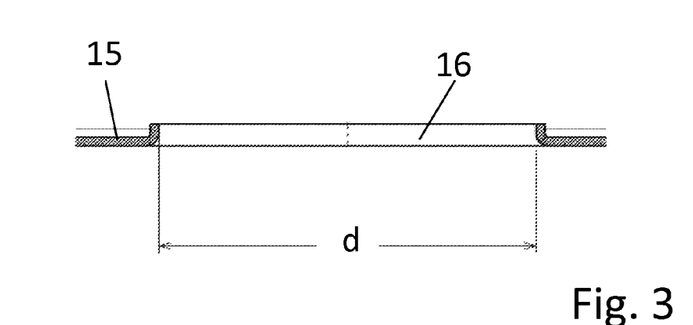
FIG. 3 is a sectional view through the structural part before the formation of the fastening region.
Figure 4:
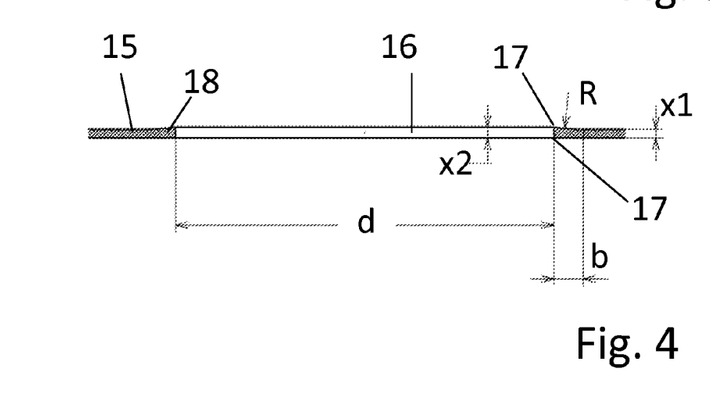
FIG. 4 is a sectional view through the structural part after the formation of the fastening region.
Figure 5:
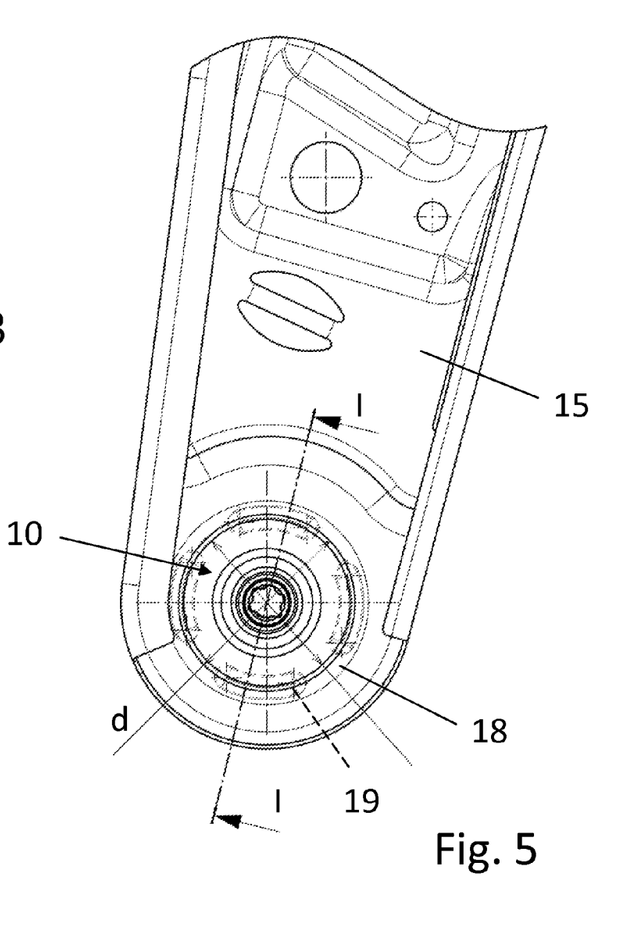
FIG. 5 is a side view of a part of the first exemplary embodiment.
Figure 6:
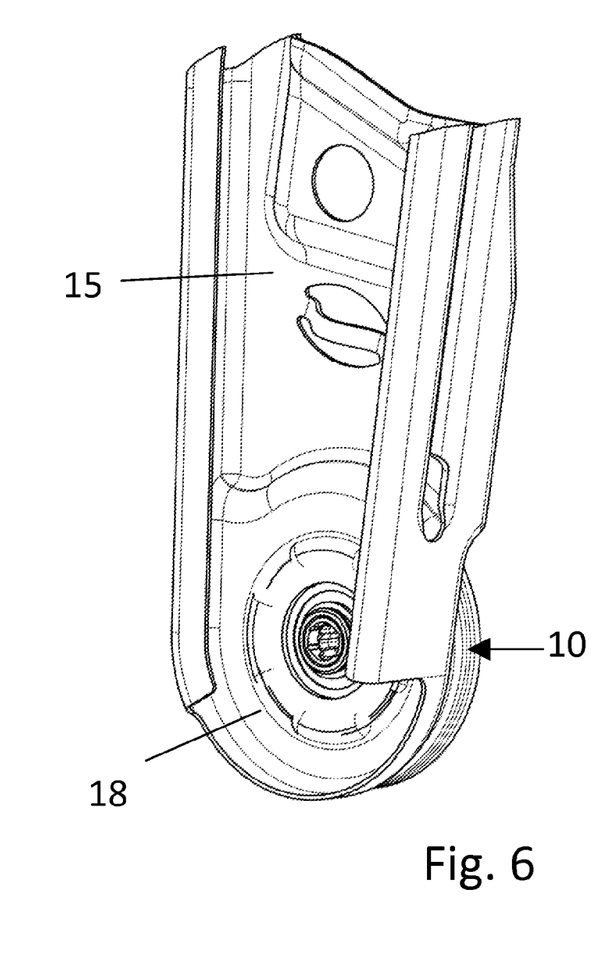
FIG. 6 is a perspective view of a part of the first exemplary embodiment.

In the first exemplary embodiment (FIGS. 1 to 6), in order to produce the fastening region 18, a collar is first of all produced from the material around the central, punched-out region (FIG. 3), wherein the opening 16 with the diameter d thereof is also produced. The material of the axially protruding collar is subsequently deformed (by axial compression and radial pushing) in such a manner that the fastening region 18 is produced. The edges 17 are formed by further machining (FIG. 4).

The fastening region 18 is a part of the structural part 15 that is formed completely integrally with the other regions of the structural part 15. Whereas the other regions of the structural part 15 are formed with a substantially constant, average material thickness $x_1$ (in the present case 1.2 mm), the fastening region 18, by contrast, has an increased (enlarged) material thickness which increases continuously in the radial direction from the average material thickness $x_1$—at the transition to the other regions of the structural part 15—to a maximum material thickness $x_2$ (in the present case 1.5 mm)—at the border of the opening 16, specifically, in the present case, of concave design in profile with a radius R (in the present case approximately 27 mm).

The diameter of the projection having the shoulder 10a on the fitting 10 is somewhat smaller than the diameter d of the opening 16, and therefore an annular gap with the gap width g is produced between the fastening region 18 and shoulder 10a. The axial size of the gap is defined by the maximum material thickness $x_2$ of the fastening region 18. The gap width g (for example 1.5 mm) can correspond approximately to the maximum material thickness $x_2$, thus producing an at least approximately square cross section. However, a gap which is as small as possible, i.e. $g \ll x_1, x_2, b$ is preferred. The shoulder 10a then bears—at least approximately—flush against the fastening region 18 or the edges 17. When the fitting 10 is inserted into the opening 16, the first weld seam 19 is subsequently provided, for example by four welding beads which are arranged in the circumferential direction of the opening 16 and partially fill the gap, if present. For a laser weld seam as the first weld seam 19, a very small, imperceptibly, small gap width g is preferred.

Figures 9, 10, 11, 12:
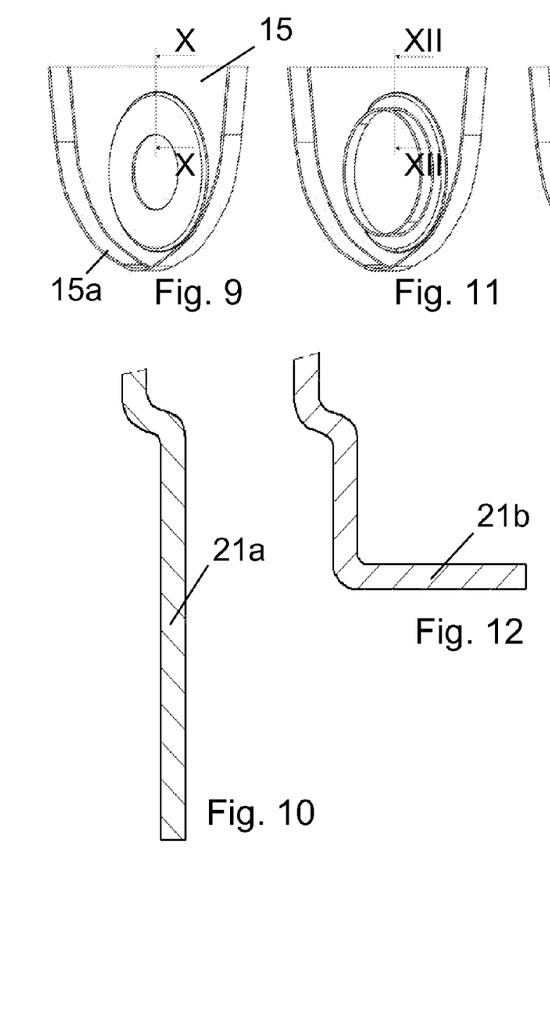
FIG. 9 is part of a perspective view of a metal sheet serving as a structural part, in a first production step.
FIG. 10 is an enlarged sectional view along the line X-X in FIG. 9.
FIG. 11 is part of a perspective view of the metal sheet from FIG. 9, in a second production step.
FIG. 12 is an enlarged sectional view along the line XII-XII in FIG. 11.
Figures 13, 14, 15, 16, 17, 18:
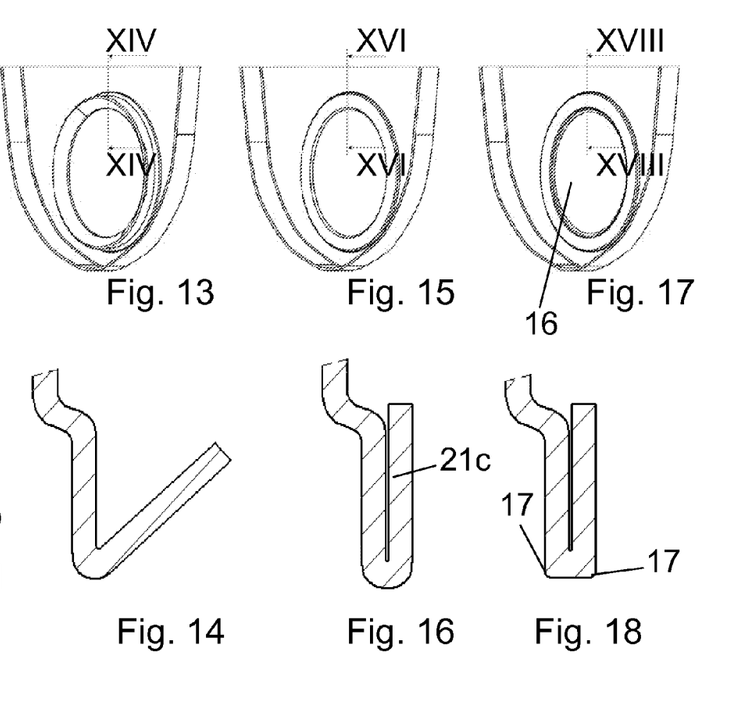
FIG. 13 is part of a perspective view of the metal sheet from FIG. 9, in a third production step.
FIG. 14 is an enlarged sectional view along the line XIV-XIV in FIG. 13.
FIG. 15 is part of a perspective view of the metal sheet from FIG. 9, in a fourth production step.
FIG. 16 is an enlarged sectional view along the line XVI-XVI in FIG. 15.
FIG. 17 is part of a perspective view of the metal sheet from FIG. 9, in a fifth production step.
FIG. 18 is an enlarged sectional view along the line XVIII-XVIII in FIG. 17.
Figure 19:
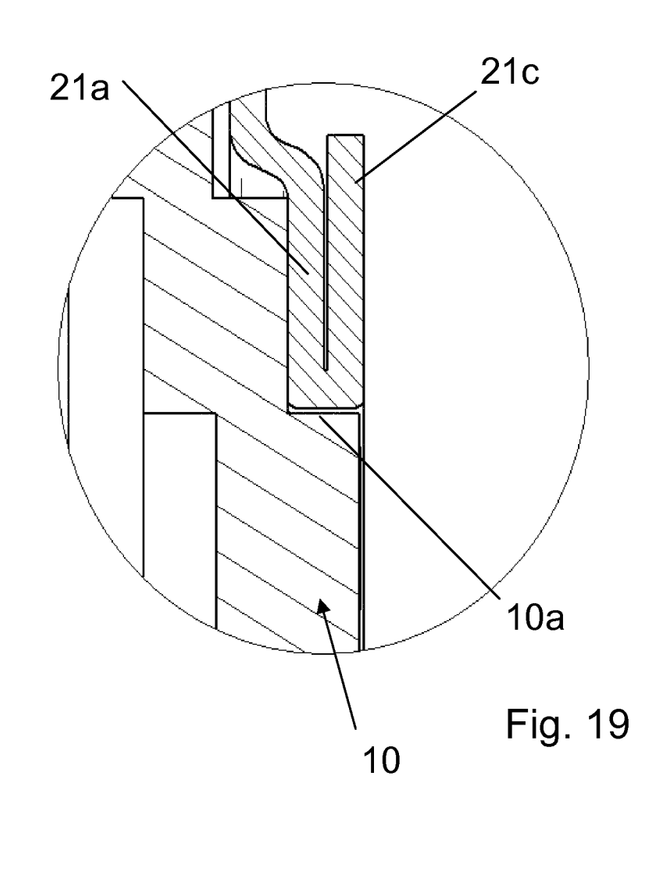
FIG. 19 is part of a schematic sectional view after the fitting and the structural part have been put together and prior to welding.
Figure 20:
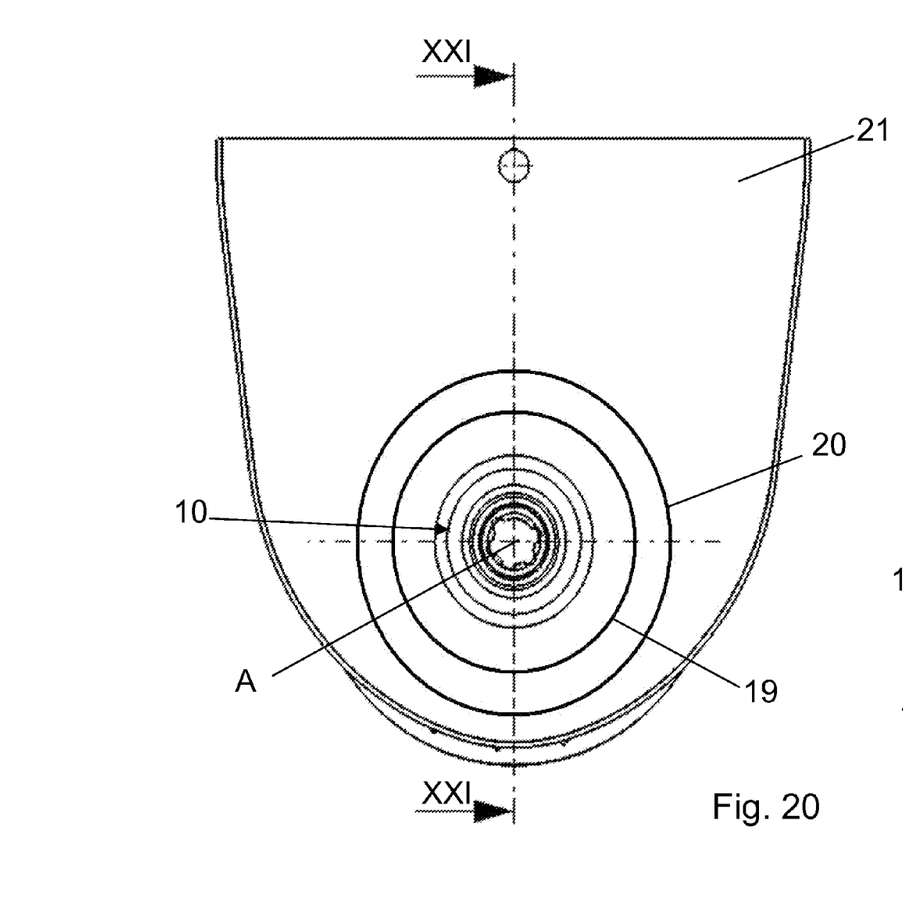
FIG. 20 is a top view of an end region of the structural part together with the fitting.
Figure 21:
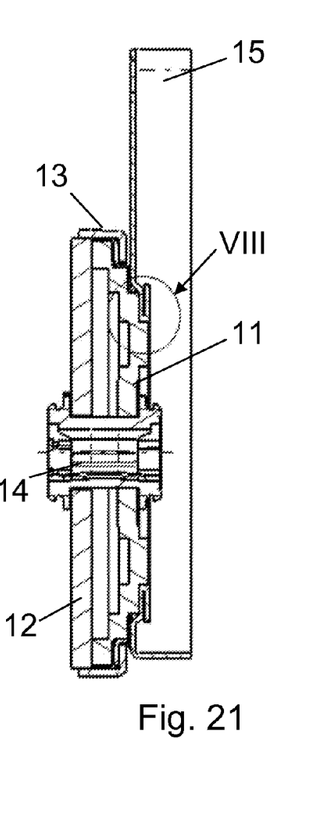
FIG. 21 is a longitudinal sectional view along the line XXI-XXI in FIG. 20.
Figure 22:
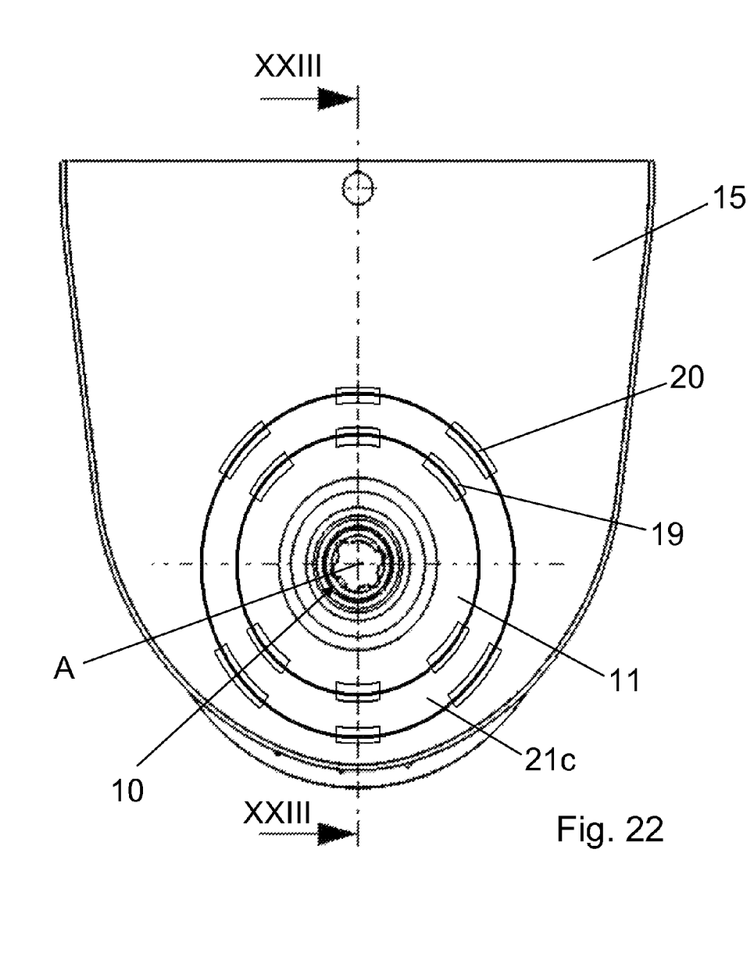
FIG. 22 is a top view of an end region of the structural part together with the fitting, said structural part and fitting being connected to each other by an alternative welding method.
Figure 23:
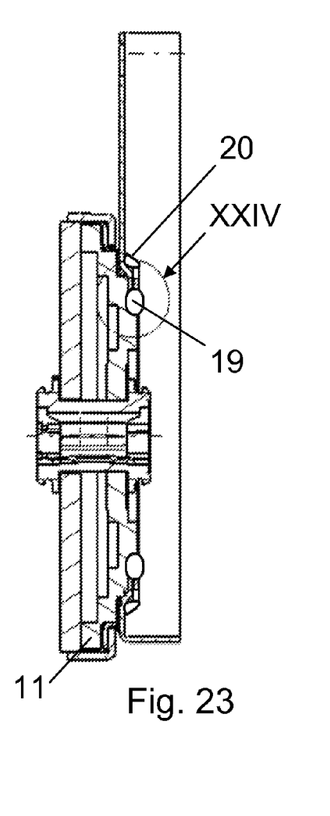
FIG. 23 is a longitudinal sectional view along the line XXIII-XXIII in FIG. 22.
Figure 24:
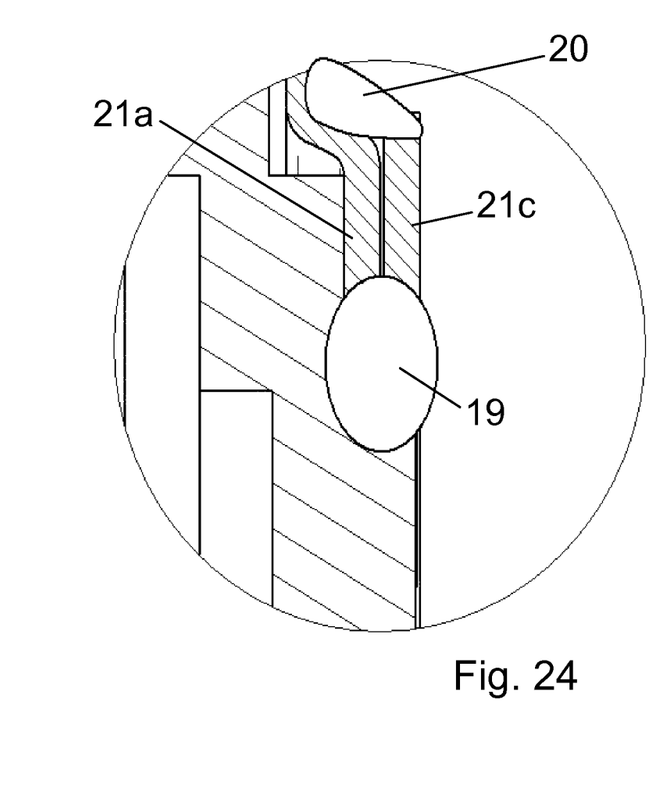
FIG. 24 is a detailed view of the detail XXIV in FIG. 23.

In the second exemplary embodiment (FIGS. 8 to 24), the fastening region 18 is produced from a circular-ring-shaped region 21a of the structural part 15, which region is arranged around the central, punched-out region (FIGS. 9, 10). Approximately the inner half of the circular-ring-shaped region 21a is bent outward through approx. 90° to form a collar region 21b (FIGS. 11, 12), wherein the bending direction corresponds to that of the outer border 15a. In a further step, said collar region 21b is bent outward further, i.e. is flanged forward, as illustrated in FIGS. 13 and 14, but this step may be omitted given suitable materials, material thicknesses and/or collar widths. In a subsequent step, the collar region 21b is flanged over to form a circular-ring-shaped, folded-over border region 21c, i.e. that surface of the circular-ring-shaped region 21a which faces the direction of the outer border 15a and has not been bent over bears against that surface of the circular-ring-shaped, folded-over border region 21c which has been bent over by 180° (FIGS. 15, 15). That part of the circular-ring-shaped region 21a which has not been bent over and the circular-ring-shaped, folded-over border region 21c together form the fastening region 18 ($x_2 = 2 \cdot x_1$) which is preferably fixed by the second weld seam 20, i.e. by a nondetachable connection of the regions 21a and 21c. Depending on the dimensional accuracy of the deformation operation, in a subsequent step, further finishing with correction of the inside diameter of the remaining circular opening 16 and the formation of the edges 17 can take place, for example by means of a further deformation operation, but if appropriate also with cutting (FIGS. 17, 18). The fitting 10 is subsequently fastened to the finished structural part 15.

Figures 28, 30:
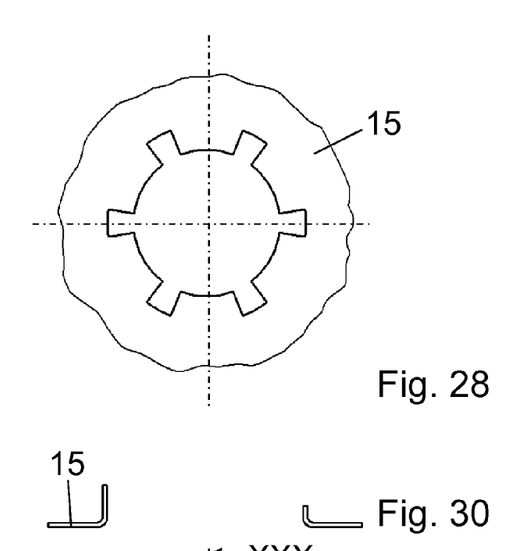
FIG. 28 is a side cutaway view showing the structural part of the third exemplary embodiment as a blank with a punched-out central region.
FIG. 30 is a sectional view along the line XXX-XXX in FIG. 29.
Figure 29:
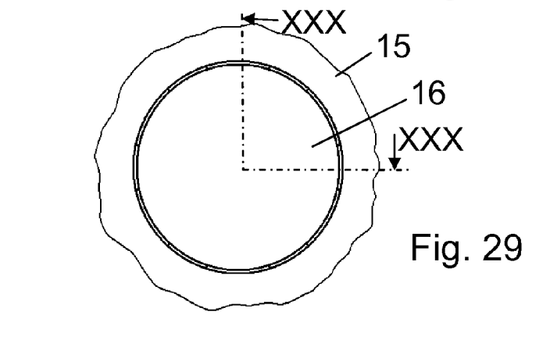
FIG. 29 is a side cutaway view showing the structural part from FIG. 28 with deployed segments after a first deformation step.
Figure 31:
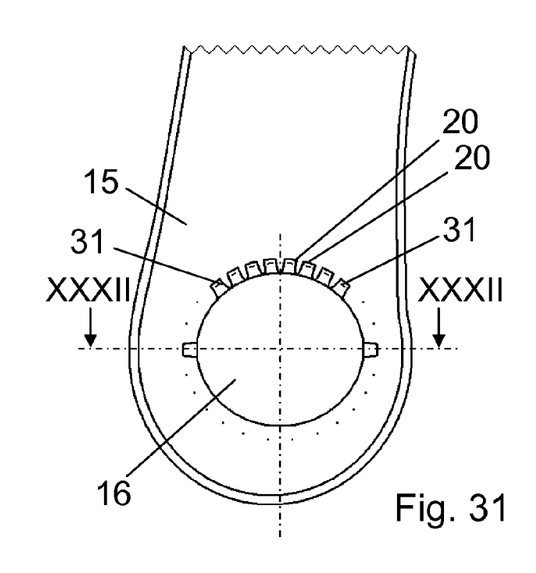
FIG. 31 is a partial view of the fourth exemplary embodiment.
Figure 32:
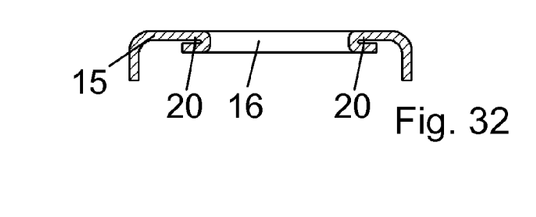
FIG. 32 is a sectional view along the line XXXII-XXXII in FIG. 31.
Figure 33:
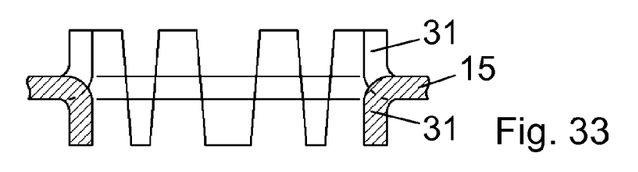
FIG. 33 is a sectional view through the structural part of the fifth exemplary embodiment with deployed segments after a first deformation step.
Figure 34:
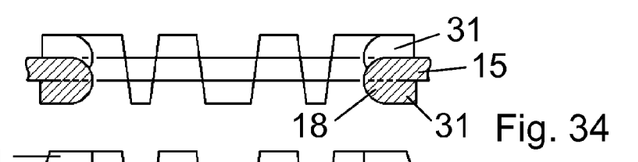
FIG. 34 is a sectional view corresponding to FIG. 33 with folded-over segments.
Figure 35:
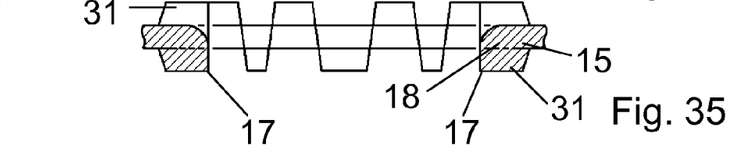
FIG. 35 is a sectional view corresponding to FIGS. 33 and 34 with edges formed.

In the third to fifth exemplary embodiments (FIGS. 26 to 35), a star is punched out as the central region (FIG. 28). This results in the production in the circumferential direction of a plurality of segments 31 next to one another which have, for example, a trapezoidal or rectangular form and are separated from one another by gaps. The segments 31 are deployed like a collar by 90° with respect to the non-deformed region of the structural part 15 (FIGS. 29, 30, 33), i.e. they point in the axial direction. The segments 31 are subsequently folded over (crimped) further radially outward such that they rest on the adjacent region of the structural part 15 in the form of a doubling of the material (x2=2·x1) (FIG. 34). The annular region which is doubled at some point forms the fastening region 18. The folded-over segments 31 are fixed to that region of the structural part 15 which is not folded over, and are preferably connected thereto by means of a respective second weld seam 20 (preferably laser weld seam) (FIGS. 26, 27, 31, 32). By means of appropriate punch geometries and calibrating operations, the material at the bending edge on the outside is shaped as far as possible without bending radii and, instead, the edges 17 are formed by further processing of said transition region between the region which is not folded over and the region which is folded over (FIG. 35). This permits improved welding later on to the fitting 10.

In the third exemplary embodiment (FIGS. 26 to 30), the segments 31 are spaced apart from one another by a spacing similar to the width thereof, i.e. the distance between the segments 31 and the width of the segments 31 are approximately identical in the circumferential direction. For example, six segments 31 are produced with a width of approximately 30° on average, with gaps in between which likewise have a width of approximately 30° on average. Said segments 31 are, for example, all folded over in the same direction, namely from the plane of that region of the structural part 15 which is not folded over onto that side of the structural part 15 which faces away from the fitting 10. When the edges 17 are formed, the region between the segments 31 is preferably deformed in such a manner that a small part thereof lands on the side of the folded-over segments 31.

In the fourth exemplary embodiment (FIGS. 31, 32), the segments 31 are of significantly smaller width and are spaced apart from one another at an even smaller distance, for example are of a width of on average 10° with an average distance therebetween of 5°. The individual segments 31 are, for example, all folded over onto that side of the structural part 15 which faces away from the fitting 10 and are secured by a respective second weld seam 20.

In the fifth exemplary embodiment (FIGS. 33 to 35), the segments 31 are folded over in an alternating manner on different sides of that region of the structural part 15 which is not folded over. Every second segment 31 is folded over onto the side facing away from the fitting 10, and every second segment 31 which is offset thereto is folded over onto the side facing the fitting 10. This results overall in triple the material thickness (x2=3·x1) for the fastening region 18, but only at some points in the circumferential direction and not over the full circumference.

Figures 36, 37:
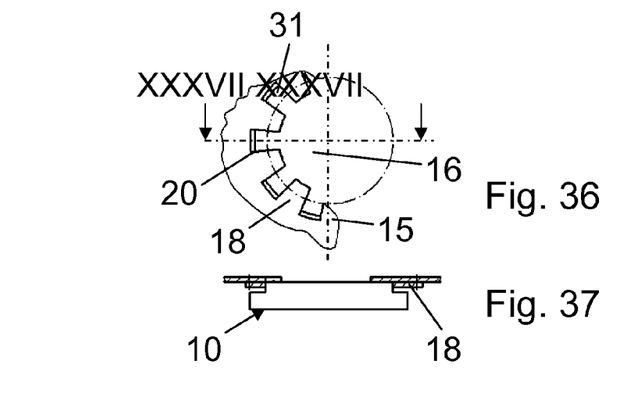
FIG. 36 is a partial view of a modification to the third to fifth exemplary embodiments without the fitting.
FIG. 37 is a sectional view along the line XXXVII-XXXVII in FIG. 36 with the fitting.

In a modification (FIGS. 36, 37) to the three abovementioned exemplary embodiments, only every second segment 31 is folded over and fastened by means of a second weld seam 20. The segments 31 which are not folded over project radially inward into the opening 16 and, when the fitting 10 is connected, come to lie on the end side thereof.

Figure 38:
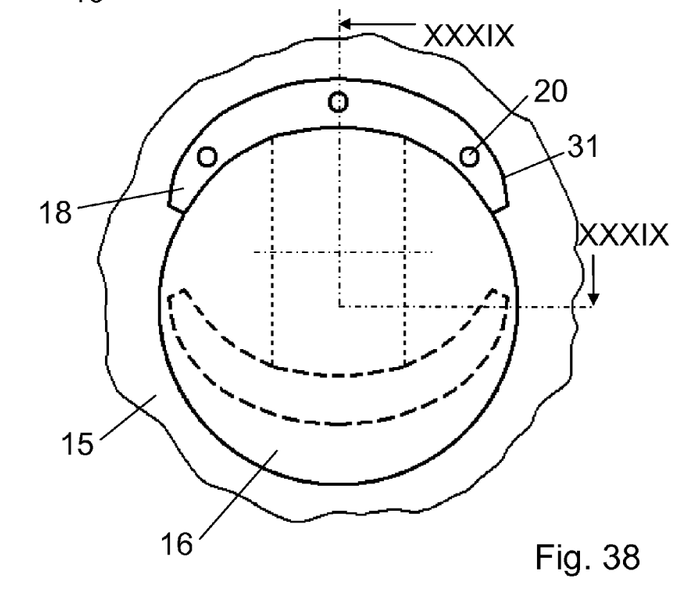
FIG. 38 is a partial view of the sixth exemplary embodiment without the fitting.
Figure 39:
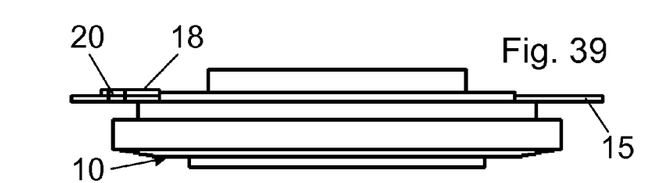
FIG. 39 is a sectional view along the line XXXIX-XXXIX in FIG. 38 with the fitting.
Figures 40, 43:
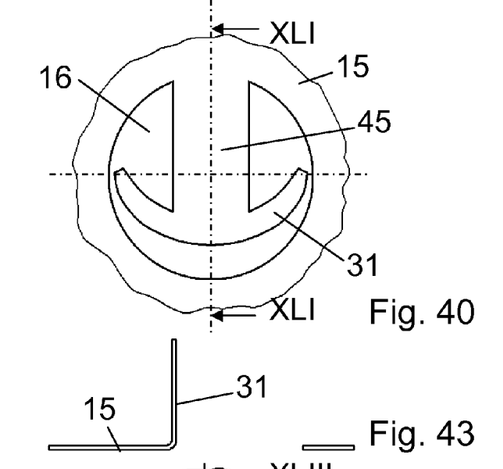
FIG. 40 is a side cutaway view showing the structural part of the sixth exemplary embodiment as a blank with a punched-out central region.
FIG. 43 is a sectional view along the line XLIII-XLIII in FIG. 42.
Figure 41:
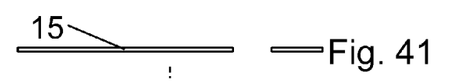
FIG. 41 is a sectional view along the line XLI-XLI in FIG. 40.
Figure 42:
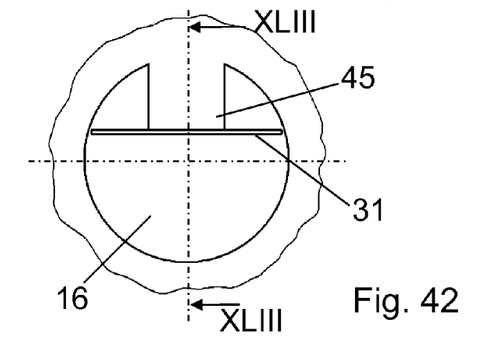
FIG. 42 is a side cutaway view showing the structural part from FIG. 40 with a deployed segment.

In the sixth exemplary embodiment (FIGS. 38 to 43), the punched-out segment 31 has a lunar shape (arc shape) with a connecting web 45 to the (upper) border of the opening 16 which is otherwise punched out to be circular (FIGS. 40, 41). The connecting web 45 is first of all folded once in the center thereof by 90° (FIGS. 42, 43) and then once again by 90° such that the segment 31 comes to lie on the (upper) border of the opening 16 on the structural part 15. By means of a second weld seam 20, which also includes the weld points, the segment 31 is connected to that region of the structural part 15 which is not folded over, thus resulting in the fastening region 18. In contrast to the three previous exemplary embodiments, the fastening region 18 is not completely distributed over the circumference of the opening 16 but rather is present merely in an arcuate manner on the upper border which is subjected to a higher load. In order to form the edge 17, the connecting web 45 is cut, for example punched, to size, as a result of which the opening 16 reaches the final size thereof (FIGS. 38, 39).

Figure 44:
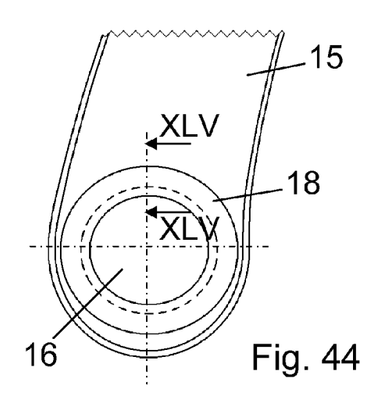
FIG. 44 is a partial view of the seventh exemplary embodiment.
Figure 45:
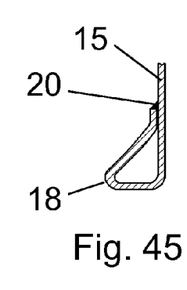
FIG. 45 is a sectional view along the line XLV-XLV in FIG. 44.

The seventh exemplary embodiment (FIGS. 44, 45) is a modification of the second exemplary embodiment. As there, a collar region is produced, of which, however, only one part, for example, only approximately half of the axial length thereof, is bent back obliquely and placed on the circular-ring-shaped region 21a, it is preferably also fixed there by the second weld seam 20. This results in a triangular profile.

Figures 46, 47:
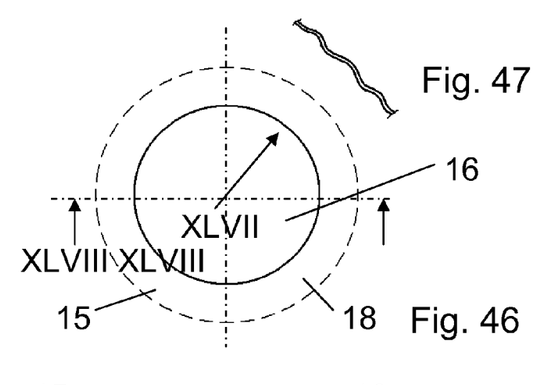
FIG. 46 is a partial view of the eighth exemplary embodiment without the fitting.
FIG. 47 is a view in the direction of the arrow XLVII-XLVII in FIG. 46 without the fitting.
Figure 48:
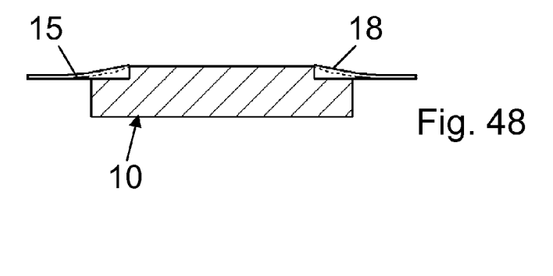
FIG. 48 is a sectional view along the line XLVIII-XLVIII in FIG. 46 with the fitting.

In the eighth exemplary embodiment (FIGS. 46 to 48), an axial widening (x2>x1) is achieved by a fastening region 18 which is wave-shaped in the axial direction (and circumferential direction), without additional material being required.

Figure 49:
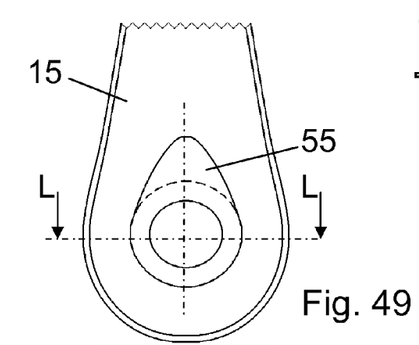
FIG. 49 is a partial view of the ninth exemplary embodiment.
Figure 50:
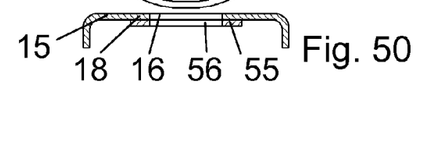
FIG. 50 is a sectional view along the line L-L in FIG. 49.

In the ninth exemplary embodiment (FIGS. 49, 50), the additional material of the fastening region 18 originates from an additional part 55 which is punched out separately with an opening 56. The opening 56 of the additional part 55 preferably has the same geometry as the opening 16 of the structural part 15. The additional part 55 is fitted to the structural part 15 in such a manner that the openings 16 and 56 are aligned, and is subsequently welded to the structural part 15 by means of the second weld seam 20. The resultant fastening region 18 then has twice the material thickness as the structural part 15 (x2=2·x1). The additional part 55 may be of annular design, or it has a drop shape, the pointed end pointing upward and reinforcing that part of the fastening region 18 which is subjected to a higher load. The fitting 10 is then fitted to the structural part 15 by, for example, the first fitting part 11 being inserted by the shoulder 10a into the openings 16 and 56. The fitting 10 and the structural part 15 are subsequently welded to each other by means of the first weld seam 19. In a modified embodiment, the opening 56 has a smaller diameter than the opening 16 such that the fitting 10 is inserted until it bears against the additional part 55.

Further reinforcement possibilities are also conceivable. Furthermore, a reinforced fastening region 18 can be produced by hardening, for example of a boron steel.

While specific embodiments of the invention have been described in detail to illustrate the application of the principles of the invention, it will be understood that the invention may be embodied otherwise without departing from such principles.

The invention claimed is:
1. A motor vehicle seat comprising:
   a fitting with two fitting parts which are rotatable relative to each other;

a structural part which has at least one opening for partially receiving the fitting and at least one fastening region which surrounds the opening and is intended for fastening the fitting via at least one first welding seam between the fastening region and one of the two fitting parts, wherein said at least one fastening region is reinforced in relation to other fastening regions of the structural part by material which accumulates during formation of the at least one opening and remains for a collar region or for segments, by means of deforming or folding over the collar region or by folding over at least one segment, wherein a plurality of segments is provided, said segments all being folded over onto the same side or onto different sides of the structural part in an alternating manner.

2. The vehicle seat as claimed in claim 1, wherein the structural part is a sheet metal punched and bent part, a circular-ring-shaped, folded-over region or a folded-over segment being bent over through 180° after an opening has been punched out.

3. The vehicle seat as claimed in claim 1, wherein the folded-over region or the folded-over segment is fixed to that region of the structural part which is not folded over.

4. The vehicle seat as claimed in claim 3, wherein an arcuate segment is provided, which segment is punched out with a connecting web in the region of the opening, the connecting web being cut to size after the segment is fixed.

5. The vehicle seat as claimed in claim 1, wherein edges which define the border of the opening are formed by further machining of the transition region between the region which is not folded over/not deformed and the folded-over/deformed region.

6. The vehicle seat as claimed in claim 5, wherein the first weld seam is arranged in the region between the shoulder and the edges of the opening.

7. The vehicle seat as claimed in claim 1, wherein the fastening region is reinforced by an additional part.

8. The vehicle seat as claimed in claim 1, wherein the fastening region is of annular or arcuate design, with a radial width which is smaller than a diameter of the opening.

9. The vehicle seat as claimed in claim 8, wherein the material thickness of the fastening region beyond the radial width increases continuously from an average material thickness of the structural part to the maximum material thickness.

10. The vehicle seat as claimed in claim 1, wherein, on one of the two fitting parts, the fitting has a shoulder which is arranged within the opening.

11. The vehicle seat as claimed in claim 1, wherein the fitting has a disk shape, said material defining a bent portion of said structural part, wherein a surface of said material is substantially parallel to a surface of said structural part.

12. A method for producing a vehicle seat, in which a fitting can be fastened to a structural part, the fitting having two fitting parts which are rotatable relative to each other, a structural part which has an opening for partially receiving the fitting and a fastening region which surrounds the opening and is intended for fastening the fitting via at least one first weld seam between the fastening region and one of the two fitting parts and material reinforcing the fastening region in relation to the other regions of the structural part, the method comprising the steps of:
a) punching out a central region in a blank of the structural part;
b) drawing a collar region or deploying segments, with the opening of the structural part being formed, wherein material of said collar region or deploying segments remains after drawing said collar region or deploying segments;
c) folding over the material to form the fastening region, wherein a plurality of segments is provided, said segments all being folded over onto the same side or onto different sides of the structural part in an alternating manner; and
d) fastening the fitting to the finished structural part.

13. A method as claimed in claim 12, wherein the fastening region is reinforced by the material.

14. A method as claimed in claim 12, wherein the folded-over region or the folded-over segment is fixed to a region of the structural part which is not folded over by means of a second weld seam, said material defining a bent portion of said structural part, wherein a surface of said material is substantially parallel to a surface of said structural part.

15. A method as claimed in claim 12, wherein an arcuate segment is provided, which segment is punched out with a connecting web the connecting web being cut to size after the segment is fixed.

16. A method as claimed in claim 12, wherein edges which define a border of the opening are formed by further machining of a transition region between the region which is not folded over/not deformed and the folded-over/deformed region.

17. The vehicle seat as claimed in claim 1, wherein the folded-over region or the folded-over segment is fixed to that region of the structural part which is not folded over by means of a second weld seam.

18. A motor vehicle seat comprising:
a fitting with two fitting parts which are rotatable relative to each other;
a structural part which has at least one opening for partially receiving the fitting and at least one fastening region which surrounds the opening and is intended for fastening the fitting via at least one first welding seam between the fastening region and one of the two fitting parts, wherein said at least one fastening region is reinforced in relation to other fastening regions of the structural part by material which accumulates during formation of the at least one opening and remains for a collar region or for segments, by means of deforming or folding over the collar region or by folding over at least one segment, said fastening region being of annular or arcuate design, with a radial width which is smaller than a diameter of the opening, wherein a material thickness of the fastening region beyond the radial width increases continuously from an average material thickness of the structural part to a maximum material thickness.

* * * * *